United States Patent
Angelina Fernández et al.

(10) Patent No.: US 10,215,569 B2
(45) Date of Patent: Feb. 26, 2019

(54) METHOD AND SYSTEM FOR DETERMINING A RELATIVE POSITION TO A TARGET

(71) Applicant: AIRBUS DEFENCE AND SPACE, S.A.U., Getafe (ES)

(72) Inventors: Hania Angelina Fernández, Getafe (ES); Javier Álvarez Ortiz, Getafe (ES); Pablo Acedo Gallardo, Leganés (ES); Marta Ruiz Llata, Leganés (ES); José Ramón López Fernández, Leganés (ES)

(73) Assignee: AIRBUS DEFENCE AND SPACE SAU, Getafe (ES)

( * ) Notice: Subject to any disclaimer, the term of this patent is extended or adjusted under 35 U.S.C. 154(b) by 289 days.

(21) Appl. No.: 15/146,684

(22) Filed: May 4, 2016

(65) Prior Publication Data
US 2016/0327398 A1 Nov. 10, 2016

(30) Foreign Application Priority Data

May 5, 2015 (EP) ................................ 15382230

(51) Int. Cl.
| | |
|---|---|
| *G01C 21/20* | (2006.01) |
| *G01S 1/70* | (2006.01) |
| *G01S 5/16* | (2006.01) |
| *G01B 11/26* | (2006.01) |
| *G01S 7/48* | (2006.01) |
| *G01S 17/42* | (2006.01) |

(52) U.S. Cl.
CPC ............. *G01C 21/20* (2013.01); *G01B 11/26* (2013.01); *G01S 1/70* (2013.01); *G01S 5/163* (2013.01); *G01S 7/4808* (2013.01); *G01S 17/42* (2013.01)

(58) Field of Classification Search
CPC ... G01C 3/00; G01C 3/08; H04N 7/00; H04N 7/18
See application file for complete search history.

(56) References Cited

U.S. PATENT DOCUMENTS

| | | | |
|---|---|---|---|
| 3,710,335 A | 1/1973 | Lepley | |
| 5,200,792 A * | 4/1993 | Tajima | .................... G01S 7/491 348/135 |
| 8,314,928 B2 | 11/2012 | Tzidon et al. | |
| 8,326,523 B2 | 12/2012 | Stimac et al. | |
| 8,352,100 B2 | 1/2013 | Stimac et al. | |
| 8,872,081 B2 | 10/2014 | Feldmann et al. | |

OTHER PUBLICATIONS

European Search Report, dated Oct. 23, 2015; Priority Document.

* cited by examiner

*Primary Examiner* — Luke D Ratcliffe
(74) *Attorney, Agent, or Firm* — Greer, Burns & Crain, Ltd.

(57) ABSTRACT

A method for determining the relative angular direction θ between a target and a transmitter. A generation of one or more light beams at the transmitter comprises diffracting broadband light in such a way that different optical frequency wavelengths are diffracted differently and a relative angular direction θ is detected by reading the optical frequency wavelength. A system is provided for determining the relative angular direction between a target and a transmitter and a system is provided for determining a relative position between a target and a transmitter in an area, wherein relative position is defined by the parameters: relative angular direction (θ1, θ2), and distance.

17 Claims, 6 Drawing Sheets

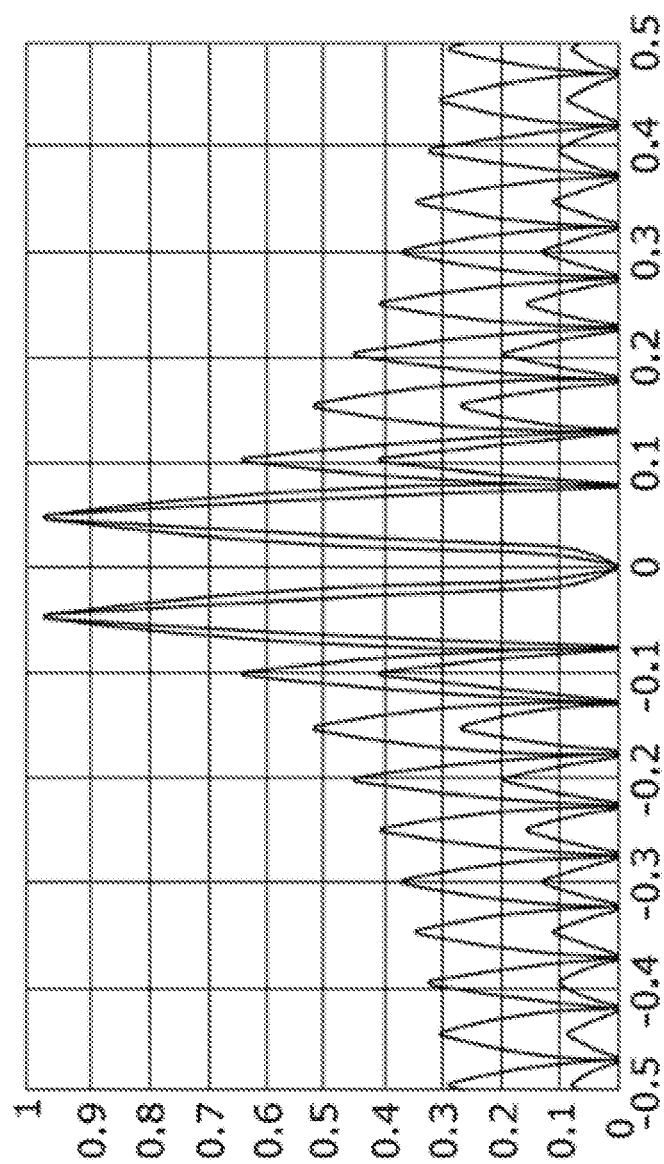

METHOD AND SYSTEM FOR DETERMINING A RELATIVE POSITION TO A TARGET

CROSS-REFERENCES TO RELATED APPLICATIONS

This application claims the benefit of the European patent application No. 15382230.9 filed on May 5, 2015, the entire disclosures of which are incorporated herein by way of reference.

BACKGROUND OF THE INVENTION

The present invention relates generally to the field of relative navigation systems and methods of relative navigation. Relative navigation systems are useful for various applications such as autonomous vehicle navigation, mid-air refueling, and space docking. In some applications, only the range between two objects is required. More particularly, the invention relates to Optoelectronic instrumentation systems and the generation and use of OFCGs (Optical Frequency Combs Generators) for determining the relative position of a target.

Relative navigation systems are useful for various applications such as autonomous vehicle navigation, mid-air refueling, and space docking. In some applications the range and the relative attitude (pitch, yaw, and roll) between two objects are required. Such information is typically gathered as a time series and used to make course corrections in one or more of the objects to enable a desired maneuver or final relative position.

U.S. Pat. No. 8,326,523 discloses a method of determining a range between first and second objects with relative movement, where a plurality of grid lines from a first origin point on the first object are projected into space. Each of the grid lines is modulated to carry a grid word to identify each grid line within the grid. The grid lines and the corresponding grid words are detected from at least three locations having a predetermined triangular relationship on the second object defining vertices. An angle is based on the location within the grid of each of the vertices. The range between the first and second objects is determined based on the set of angles.

U.S. Pat. No. 8,352,100 describes a method of providing a relative navigation system by projecting a grid defining a first relative reference frame associated with a first origin, the grid being repeatedly detected from a second object having a second relative reference frame associated with a second origin point on a second object. The attitude or range of at least one of the first and second objects is adjusted based on the determined range and relative attitude measured.

U.S. Pat. No. 8,872,081 describes a method for stabilizing a grid projected from a grid generator which includes determining a change in the reference frame of the grid generator relative to prior grid projection, and altering the grid data of a subsequent grid projection such that the subsequent grid projection appears stabilized relative to a prior grid projection.

The above mentioned solutions of the state of the art implement time consuming algorithms for acknowledging the relative position of a target and they usually depend on more than one detector or system, such as two grids, for the detection of, for example, an aircraft.

SUMMARY OF THE INVENTION

The present invention provides an alternative solution of a method for determining the relative angular direction $\theta$ between a target and a transmitter. There is also provided a method for determining a relative position between a target and a transmitter in an area, wherein relative position is defined by the parameters relative angular direction and distance, a system for determining the relative angular direction between a target and a transmitter and a system for determining a relative position between a target and a transmitter. Dependent claims define particular embodiments of the invention. All the features described in this specification (including the claims, description and drawings) and/or all the steps of the described method can be combined in any combination, with the exception of combinations of such mutually exclusive features and/or steps.

In particular, in a first aspect of the invention, there is provided a method for determining the relative angular direction $\theta$ between a target and a transmitter, the method comprising the following steps:

producing one or more light beams, transmitting by the transmitter such one or more light beams, wherein a light beam indicates a relative angular direction from the transmitter, receiving by the target one or more of the light beams, wherein the generation of the one or more light beams comprises diffracting broadband light in such a way that different optical frequency wavelengths are diffracted differently and a relative angular direction $\theta$ is detected by reading the optical frequency wavelength.

In the present description, broadband light is to be understood as a radiation in the optical (or infrared) wavelength range having a wide spectral coverage (continuous or discrete) around a central wavelength.

Reading of the optical frequency wavelength may be performed by a spectrometer, in such a way that the angular position in space is determined or indicated by the light beam which is received or read. In terms of colors, this might be understood as receiving the yellow color out from an initial beam which is diffracted. The yellow color is diffracted in a specific angular direction by, for example, a diffraction grating. Therefore, if the element configured to read the optical frequency wavelength which is received, for example, the spectrometer is configured to relate the yellow color with a determined or specific angular direction in an area, then the determination is made.

In certain embodiments the broadband light which is generated is not a continuous optical spectrum; this is to say, broadband light comprises discrete spectral lines (super continuum) or multimode light.

In certain embodiments at least the multimode light comprises an optical frequency comb.

A frequency comb is a light beam whose spectrum comprises a series of discrete, equally spaced elements. Frequency combs may be generated by amplitude modulation of a continuous wave laser or stabilization of a pulse train generated by a mode locked laser.

The frequency domain representation of a perfect frequency comb is a series of delta functions spaced according to $$f(n) = f_0 + n * f_r$$

where n is an integer, which corresponds to different colors $f_r$ is the comb tooth spacing or mode repetition rate, $f_0$ is the carrier offset frequency, which is less than $f_r$.

This frequency is in the optical domain ($f_o$=200 THz for a wavelength of 1.5 micron).

Several methods may be used to obtain $f_r$ and $f_o$.

In certain embodiments, at least a light beam comprises at least two optical frequency combs or Dual Frequency comb:
- a first optical frequency comb and
- a second optical frequency comb, first and second frequency combs comprising the same $f_o$ and comprising respective $f_{r1}$ and $f_{r2}$ where $f_{r1}$ is different from $f_{r2}$, and wherein $f_r$ is the comb tooth spacing or mode repetition rate, $f_o$ is the carrier offset frequency.

In other words, the light beam which is transmitted comprises a dual comb which is, in turn, diffracted.

Frequency combing the multimode light with a second reference signal, a second Optical Frequency Comb at a different repetition rate, allows measuring a received wavelength by mapping the optical frequencies into radio or electronic frequencies. Advantageously measuring radio frequencies require less sophisticated equipment for easier and quicker to perform than measuring by a spectrometer.

In a preferred embodiment $f_r$ is much smaller than $f_o$. For example, $f_r/f_o \sim 10\text{-}9$ and $\Delta f = f_{r1} - f_{r2} \ll f_{r1}, f_{r2}$.

In certain embodiments at least a light beam comprises two dual frequency combs comprising different repetition rates said two dual frequency combs being transmitted in two different directions forming a grid in two angular directions. Advantageously this allows positioning a target in two angular directions in such a way that, if the directions are perpendicular to each other, it is possible to differentiate height and width.

The combination of a dual comb and a diffraction grating allows for detecting a relative angular direction θ by reading an electronic frequency associated with a mixing between the different modes.

In certain embodiments the relative angular direction θ is determined by the target receiving the one or more light beams. This is the case of having an active target, where the target is able to know its position and the position is forwarded by the active target to the transmitter for both to know the position.

In certain embodiments the relative angular θ direction is further determined by the transmitter receiving the reflection of the one or more light beams from the target. This allows the use of passive targets. This embodiment is opposite or complementary to the previous case. In the case of having a passive target, the target reflects the beam; the detector in the transmitter receives the reflection of the passive target with no need for forwarding the beam by any active target. In certain embodiments both the transmitter and the target determine the relative angular θ direction; advantageously redundancy makes the method more reliable.

A method according to the above mentioned embodiments allows for determining the pitch and yaw or yaw and roll of an aircraft in flight when it enters an area of detection.

In certain embodiments a method according to the invention comprises determining a position between a target and a transmitter, wherein relative position is defined by the parameters relative angular direction and distance, the method comprising the steps of:

determining two or more relative angular directions θ1, θ2 between two or more receptors comprised in the target and the transmitter by a method according to the invention, and determining the distance between the target and the transmitter by triangulation, given a predetermined distance between the two or more receptors and the two or more relative angular directions θ1, θ2.

This embodiment advantageously allows the detection of, not only the angular position or pitch and yaw or yaw and roll of an aircraft in flight, but also the third dimension or distance to a target or aircraft. In the state of the art, determining an angular position and distance to a target is performed using at least three detectors. As a difference, the solution of the present invention allows for determining the third dimension with the use of two detectors.

In a second aspect of the invention there is provided a system for determining the relative angular direction between a target and a transmitter configured to generate light beams, wherein the generation of the one or more light beams comprises diffracting broadband light in such a way that different optical frequency wavelengths are diffracted differently and a relative angular direction θ is detected by reading the optical frequency wavelength, comprising a transmitter comprising one or more broadband light sources, one or more diffraction gratings, configured to receive broadband light from the broadband light source, a target comprising one or more receptors configured to receive one or more light beams generated by a method according to the first aspect of the invention, means in connection with the one or more receptors configured to determine the relative angular direction by reading the optical frequency wavelength by a method according to the first aspect of the invention.

Means configured to determine the relative angular direction are means which may be, for example, a computer, or a microprocessor or a device configured to determine relative angular direction by reading an optical frequency wavelength of the one or more light beams. The computer, or microprocessor or device may be connected with a photodetector which receives and reads the light beams and the computer, or microprocessor or device translates the optical frequency to an electronic frequency.

In certain embodiments the system comprises one or more multimode light sources comprising a monomode light source, for example, a laser light source, and one or more dual-optical frequency comb generators OFCG configured to receive light from the monomode light source one or more diffraction gratings, configured to receive the Dual Optical Frequency Comb from the OFCG, and means configured to determine the relative angular direction by reading an optical frequency wavelength of the one or more light beams, said frequency wavelength related to an electronic frequency received by the receptor.

In certain embodiments the system further comprises a grid generator, preferably two cylindrical lenses.

In certain embodiments the system further comprises an aircraft, wherein the aircraft comprises the target.

In certain embodiments the system further comprises a further aircraft, wherein the further aircraft comprises the transmitter.

In a further aspect of the invention there is provided a system for determining a relative position between a target and a transmitter in an area, wherein a relative position is defined by the parameters relative angular direction (θ1, θ2) and
distance (d),
the system comprising
a transmitter configured to generate light beams, wherein the generation of the one or more light beams comprises diffracting broadband light in such a way that different optical frequency wavelengths are diffracted differently and a relative angular direction θ is detected by reading the optical frequency wavelength, the transmitter comprising
one or more broadband light sources,
one or more diffraction gratings,
and
a target comprising two or more receptors,
means in connection with the two or more receptors, said means configured to determine two or more relative angular directions θ1, θ2 by reading two or more optical frequency wavelengths by a method according to the first aspect of the invention, and
means configured to determine the distance (d) between the target and the transmitter by triangulation, given a predetermined distance between the two or more receptors and the two or more relative angular directions θ1, θ2 according to the first aspect of the invention.

The means configured to determine the distance (d) between the target and the transmitter by triangulation may be a computer, or a microprocessor configured to compute a distance by triangulation, given relative angular direction (θ1, θ2) and a predetermined distance between the two or more receptors.

In certain embodiments the system further comprises a grid generator, preferably two cylindrical lenses. Advantageously the grid may cover a wide area in space, for example, and a relative position may be determined with two coordinates.

In certain embodiments the system further comprises an aircraft wherein the aircraft comprises the target.

In certain embodiments the system further comprises a further aircraft wherein the further aircraft comprises the transmitter. Advantageously, the invention allows the relative position between two aircraft to be determined in a short period of time in comparison with the systems and methods of the state of the art.

This solution combines spectrometric techniques with optic concepts such as diffraction so that a relative position between two elements may be determined, for example for determining the relative position between two aircraft in flight.

In the state of the art, relative positions are measured using monomode laser lights amplitude modulated. The invention advantageously allows for obtaining a space sweep with the use of a single source, taking advantage of diffraction into multiple modes.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIG. 4 represents the optical spectrum of the dual-comb source and the received frequency associated to the mixing of the superimposed lobes shown in the figure as $\Delta f = f_{r1} - f_{r2} \ll f_{r1}, f_{r2}$

DETAILED DESCRIPTION OF THE PREFERRED EMBODIMENTS

The examples below relate generally to a system for the determination of angular and relative positions between two objects, particularly between a target (1) and transmitter (2).

Transmitter and Receiver

Figure 1:
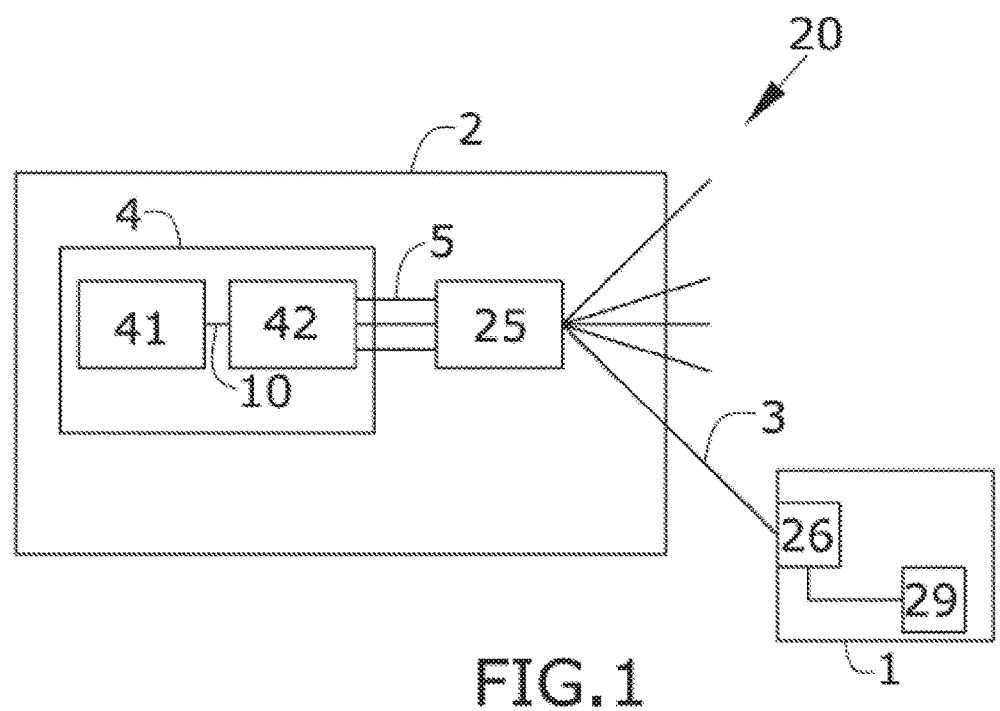
FIG. 1 shows a system according to the invention.

FIG. 1 represents a transmitter (2), which may be installed on tanker aircraft, and a receiver (1).

The transmitter (2) comprises
a broadband light source (4) comprising
a monomode light source (41),
an optical frequency comb generator OFCG (42), configured to receive the light (10) from the monomode light source (41), and configured to generate the multimode light (5) or optical frequency comb (5).
one or more diffraction grating (25), configured to receive the Optical Frequency Comb (5) from the OFCG (42).

In a particular example, the transmitter (2) comprises the following features (in one axis):
35° cone coverage
Angular resolution=0.005° to 30 meters (7000 lobes are estimated)
Opening of the lobe in the orthogonal direction=35°
Transmission of signal in the optical domain, particularly in the infrared range used for optical communications (Wave length=1550 nm). This provides several benefits:
Low cost associated to the use of communications components,
High spatial resolution (angular) due to the low wavelength used,
Wave length traditionally "Eye-safe."

The receiver (1) in FIG. 1 comprises
a receptor (26), with the capacity to read the incident light wavelength (spectrometer) configured to receive one or more light beams (3) from one or more diffraction grating (25),
means (29) for determining the relative angular direction by reading the incident light wavelength in connection with the receptor (26).

The transmitter (2) is configured to produce of the one or more light beams (3) and at least two optical frequency combs in a dual Optical Frequency comb configuration:
a first optical frequency comb and
a second optical frequency comb,
first and second frequency combs comprising the same fo and comprising respective $f_{r1}$ and $f_{r2}$ where $f_{r1}$ is different from $f_{r2}$, and
wherein
$f_{r1}$, $f_{r2}$ is the comb tooth spacing or mode repetition rate,
$f_0$ is the carrier offset frequency.

The described example uses a high-frequency modulation. The frequencies used in this example are:

$f_0$=200 THz (λ=1500 nm, telecom wavelength).
$f_{r1}$=10 GHz,
$f_{r2}$=10.00001 GHz, Being such a small difference frequencies, the wavelengths of both combs are identical from the point of view of diffraction (Δλ/λ<<1) so the analysis for only one of them may be performed as follows, for example for a central wavelength of 1550 nm, and having regard of FIG. 2.

Figure 2:
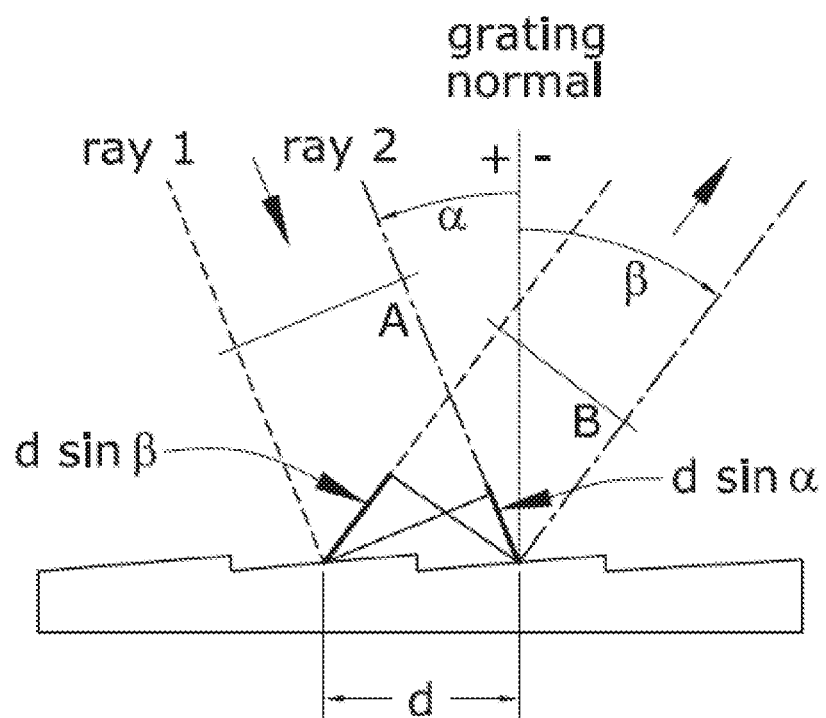
FIG. 2 represents a diffraction grating and the principle of reflection of two parallel rays, and the influence of the wavelength of the incident light in the reflection angle.

In FIG. 2 a diffraction grating functioning in reflection is shown. Given a standard grating of 1000 lines/mm (d=1 μmm), for the given central wavelength the grating equation indicates that d(sin α+sin β=λ); given c=λ*f; ∂β/∂α, and Δf=$f_{r1}$-$f_{r2}$=10 GHz results in ∂β~0.1 mrad. Therefore 0.1 mrad per line=0.005° per grid line. The fact that the separation between two lobes (m, m+1) is 0.1 mrad implies that 35°/0.005°=7000 lines are required at least to have a measurement range of 35°. As the angular separation ∂β is given by $f_{r1}$ and $f_{r1}$ (that can be adjusted), the invention allows reducing the number of grid lines required by having ∂β=1 mrad, either changing $f_{r1}$ and $f_{r1}$ or using various gratings in cascaded to increase the divergence angle.

Transmitter

Figure 3:
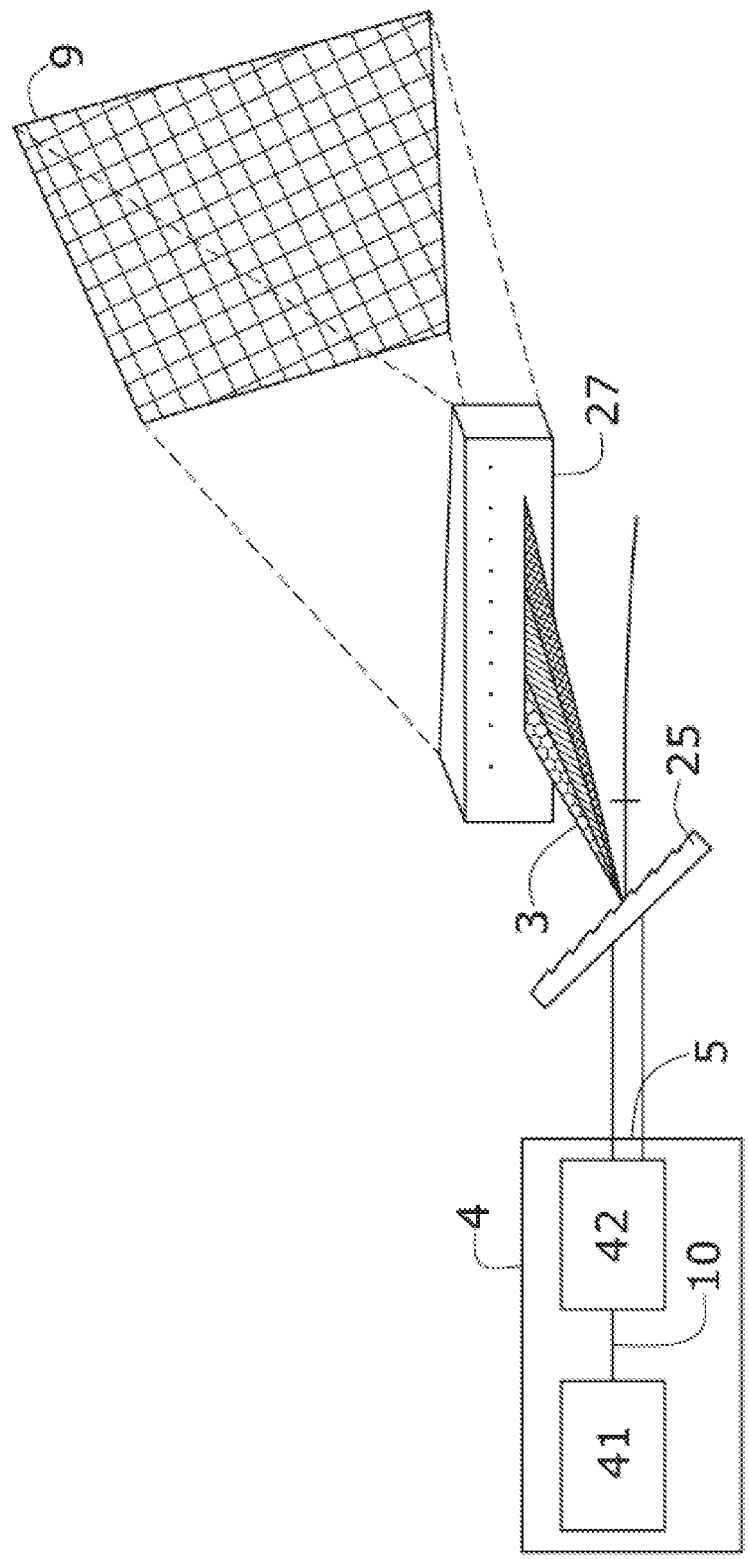
FIG. 3 shows the transmitter part of a system according to the invention.

FIG. 3 shows a series of entities which may be comprised in a system according to the invention, in the transmitter (2). FIG. 3 shows:

a light source (41), a dual optical frequency comb generator OFCG (42), configured to receive the light (10) from the light source (41), one or more diffraction grating (25), configured to receive one or more dual Optical Frequency Comb (5) from the OFCG (42), a grid generator (27), for example a couple of cylindrical lenses, from which a grid (9) is formed.

Other Data for the Transmitter issued Power: 5 W
Number of lines: 700
losses in the optical: 10 dB
divergence collimator: 0.047°
spot width in the orthogonal direction (35° to 30 m): 9.46 m
output spot diameter: 12 mm
spot size on detection: 76×9460 mm With these data, the power received in reception may be: Prec=75 nW.

In a particular example, the transmitter may comprise an acousto-optic modulator in the OFCG in such a manner that it inserts an offset frequency, $f_{AOM}$, so that in the direction θ=0 the detector would solve a positive frequency instead of a frequency of 0 Hz.

Receiver

In detection the two Optical Frequency Combs (5) are overlapped, or the wavelengths of both combs are identical from the point of view of diffraction (Δλ/λ<<1), so the actual electronic frequency detected (in the case of using an acousto-optic modulator) is fout=$f_{AOM}$+m ($f_{r1}$-$f_{r2}$)=$f_{AOM}$+m 10 kHz. This is represented in FIG. 4, where "m" represents the modes or "colors" of the received light. For example, for m=0, the yellow color is obtained by detecting a frequency of fout=$f_{AOM}$, so that it would mean an angular position respective to yellow color. For m=1 the orange would be obtained, so it is possible to know the color and therefore the direction by detecting the frequency fout=$f_{AOM}$+m 10 KHz.

The recovering of the electronica frequency (fout) will be implemented digitally using an FPGA with implementing FFTs.

Extraction of Yaw and Roll.

In a first approximation, there are two possible alternatives to implement a two-axis, i.e., to extract information uniquely yaw and roll.

1. Wavelength Division: In this case two combs may be used on two different wavelengths (1550 nm and 1310 nm to leverage standard communications components). This approach requires different listeners for each of the axes, which doubles the detection electronics.

2. Division in the frequency domain: In this case the two dual combs produce different outputs fout: fout=$f_{AOM}$+m ($f_{r1}$-$f_{r2}$)=$f_{AOM}$+m 10 kHz. (10, 20, 30 KHz for the first dual comb or axis) and fout=$f_{AOM}$+5 kHz+m 10 KHz (15, 25 kHz for the second dual comb or axis) may be used. This would bring the following implications:

same sensors and the same detection electronics may be used (no need to double the detection system);

the detection electronics need to be modified slightly increasing its frequency resolution (larger FPGA), however this can help with aspects associated to noise bandwidth;

it is highly desirable to synchronize the transmitter and receiver.

Figure 5A:
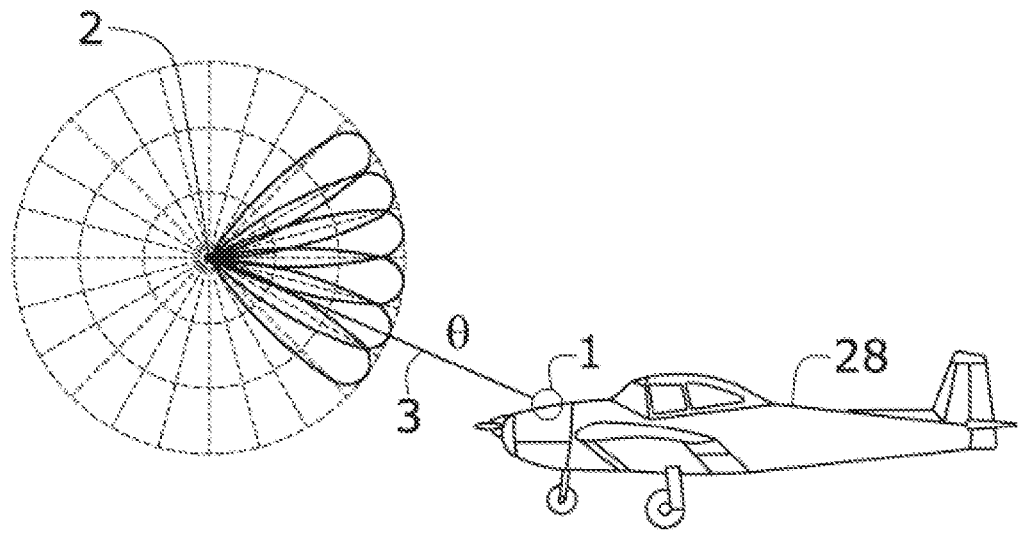
FIG. 5A shows a transmitter and an active detector according to the invention.

FIG. 5A shows an example of the relative angular direction θ being determined by a target, an aircraft (28), receiving the one or more light beams (3). This is the case of having an active target in the aircraft (28), where the target is able to know its position and the position is forwarded by the active target or aircraft (28) to the transmitter (2), which may be a further aircraft, for both to know the position.

Figure 5B:
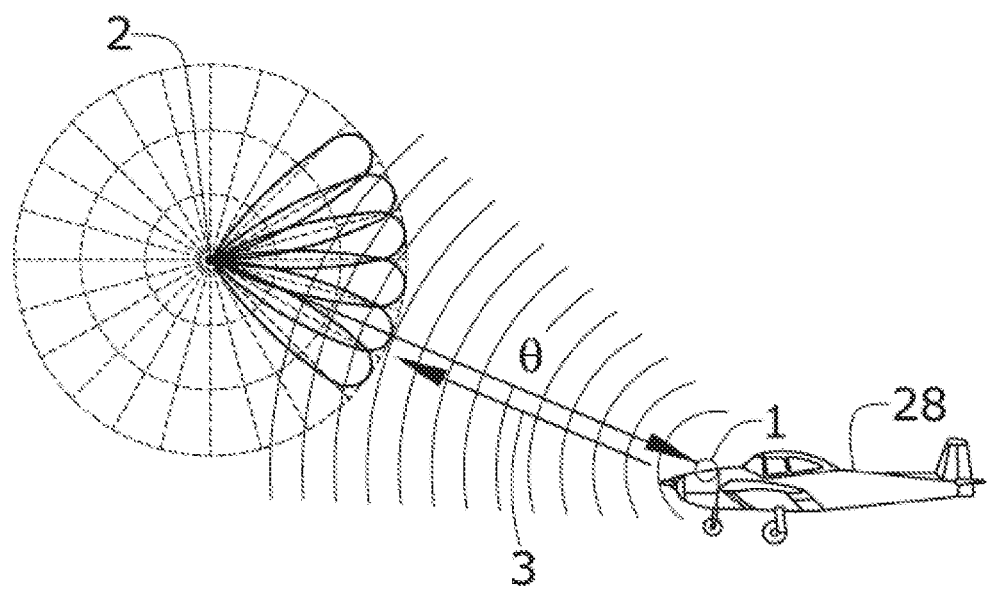
FIG. 5B shows a transmitter and a passive detector according to the invention.

FIG. 5B shows an example of the relative angular θ direction being determined by the transmitter (2) receiving the reflection of the one or more light beams (3) from the target (28). This allows the use of passive targets. This embodiment is opposite or complementary to the previous case. In the case of having a passive target in FIG. 5B, the target reflects the beam; a detector in the transmitter (2) receives the reflection of the passive target with no need of forwarding the beam (3) by any active target.

Third Dimension (z).

Figure 6:
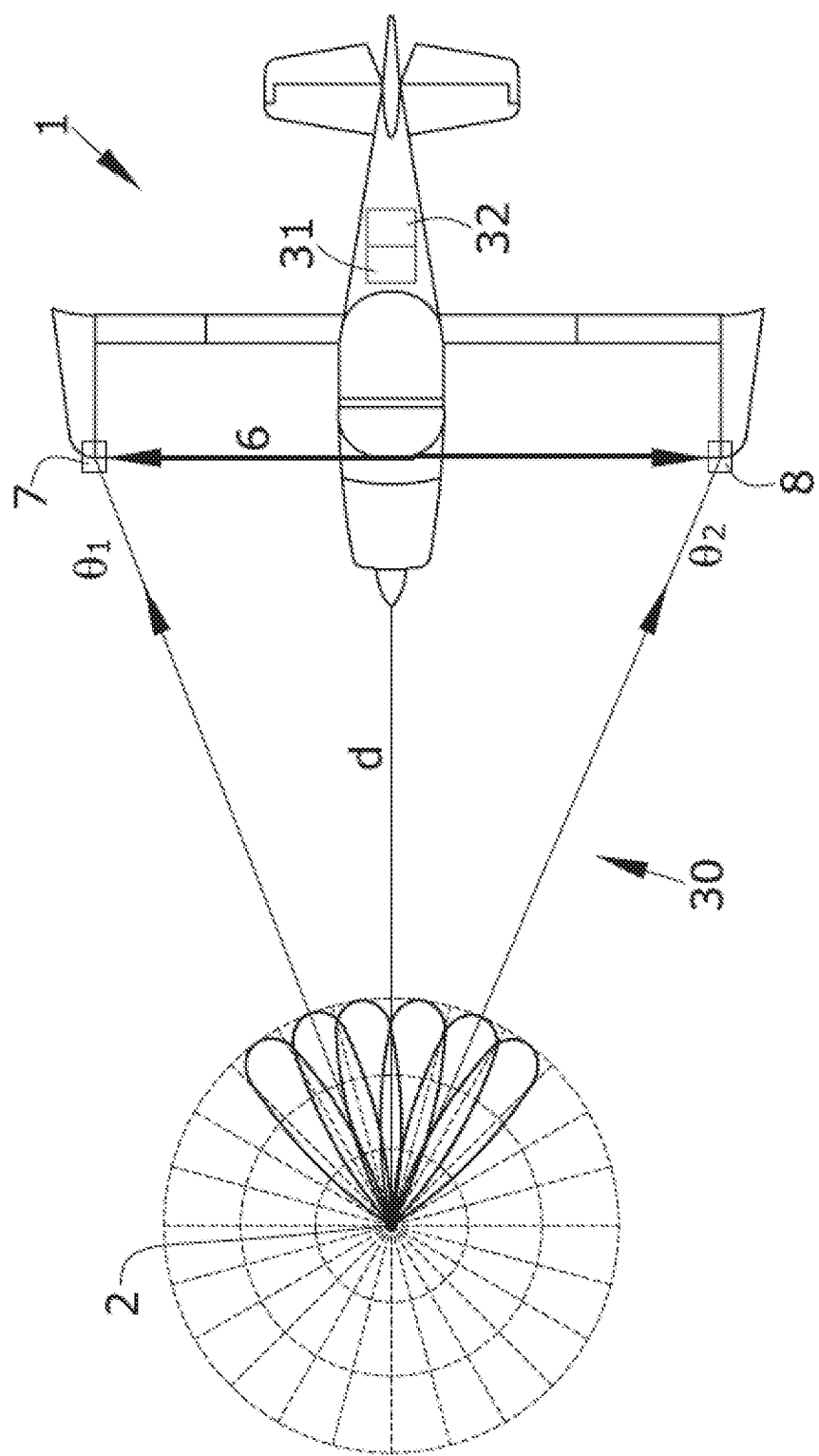
FIG. 6 shows a system according to the invention where the distance is calculated by a method according to the invention.

The proposed system is able to provide with two coordinates (yaw and roll), a third coordinate (distance) to be necessary to obtain the position of the object. This is represented in FIG. 6 where a system (30) for determining a relative position between a target (1) and a transmitter (2). In this example the relative position is defined by the parameters relative angular direction (θ1, θ2) and
distance (d).

FIG. 6 shows a system (30) comprising
a transmitter (2) and
a target (1) comprising two receptors (7, 8), for example photodiodes.

The system (30) in FIG. 5 further comprises means (31) in connection with the two or more receptors (7, 8), said means (31) configured to determine two or more relative angular directions θ1, θ2 by reading two or more electronic frequencies, and means (32) configured to determine the distance (d) between the target (1) and the transmitter (2) by triangulation, given a predetermined distance (6) between the two or more receptors (7, 8) and the two or more relative angular directions θ1, θ2.

Advantages

Some of the advantages of a method according to the invention are:

quick measurements since an electronic frequency is to be detected instead of scanning a laser light; this entails that it is possible to detect several targets in a short period of time;

possibility of working with passive receptors;

It may allow guidance of an aircraft during the approach path to a tanker aircraft;

The size of the detected object is no relevant in the case of an active detector;

In the case of a passive target the receiver may comprise a retroreflector for avoiding the whole aircraft reflecting a wide area of beams (3). The retroreflector may be mounted, for example on the wings of the airplane to provide with the two locations to extract also the third dimension.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for determining a relative angular direction $\theta$ between a target and a transmitter, the method comprising the following steps:

producing one or more light beams, transmitting, by the transmitter, the one or more light beams, wherein a first light beam in the one or more light beams indicates a relative angular direction from the transmitter, receiving, by the target, one or more of the one or more light beams, wherein the generation of the one or more light beams comprises diffracting a broadband light in such a way that different optical frequency wavelengths are diffracted differently and a relative angular direction $\theta$ is detected by reading an optical frequency wavelength, wherein at least one light beam comprises at least two optical frequency combs or a dual frequency comb, comprising:

a first optical frequency comb and a second optical frequency comb, the first and second frequency combs comprising a same $f_0$ and comprising respective $f_{r1}$ and $f_{r2}$ where $f_{r1}$ is different from $f_{r2}$, and wherein $f_{r1}, f_{r2}$ is the comb tooth spacing or mode repetition rate, $f_0$ is the carrier offset frequency.

2. A method according to claim 1 wherein the broadband light comprises discrete spectral lines or multimode light.

3. A method according to claim 2 wherein the broadband light or the multimode light comprises an optical frequency comb.

4. A method according to claim 1 wherein at least one light beam comprises two dual frequency combs comprising different repetition rates, said two dual frequency combs being transmitted in two different directions forming a grid in two angular directions.

5. A method according to claim 1 wherein the relative angular direction $\theta$ is determined by the target receiving the one or more light beams.

6. A method according to claim 1 wherein the relative angular direction $\theta$ is determined by the transmitter receiving a reflection of the one or more light beams from the target.

7. A method for determining a relative position between a target and a transmitter in an area, wherein relative position is defined by the parameters relative angular direction and distance, the method comprising the steps of:

determining two or more relative angular directions $\theta 1$, $\theta 2$ between two or more receptors, comprised in the target and the transmitter, by respective methods comprising the steps of:

producing one or more light beams, transmitting, by the transmitter, such one or more light beams, wherein a light beam indicates a relative angular direction from the transmitter, receiving, by the target, one or more of the light beams, wherein the generation of the one or more light beams comprises diffracting broadband light in such a way that different optical frequency wavelengths are diffracted differently and a relative angular direction $\theta$ is detected by reading the optical frequency wavelength, determining the distance between the target and the transmitter by triangulation, given a predetermined distance between the two or more receptors and the two or more relative angular directions $\theta 1$, $\theta 2$.

8. A system for determining the relative angular direction between a target and a transmitter configured to generate light beams, wherein the generation of the one or more light beams comprises diffracting broadband light in such a way that different optical frequency wavelengths are diffracted differently and a relative angular direction $\theta$ is detected by reading the optical frequency wavelength, comprising a transmitter comprising one or more broadband light sources, one or more diffraction gratings, configured to receive broadband light from the one or more broadband light sources, and a target comprising one or more receptors configured to receive one or more light beams generated by a method comprising the steps of:

producing one or more light beams, transmitting, by the transmitter, such one or more light beams, wherein a light beam indicates a relative angular direction from the transmitter, receiving, by the target, one or more of the light beams, wherein the generation of the one or more light beams comprises diffracting broadband light in such a way that different optical frequency wavelengths are diffracted differently and a relative angular direction $\theta$ is detected by reading the optical frequency wavelength, and means in connection with the one or more receptors configured to determine the relative angular direction by reading the optical frequency wavelength according to the method.

9. The system according to claim 8 wherein
the broadband light source comprises:
a monomode light source, and
one or more optical frequency comb generators, configured to receive the light from the monomode light source,
and the optical frequency wavelength is related to an electronic frequency which is received by the one or more receptors.

10. The system according to claim 9 wherein the monomode light source comprises a laser light source.

11. The system according to claim 8 further comprising a grid generator.

12. The system according to claim 11 wherein the grid generator comprises two cylindrical lenses.

13. The system according to claim 8 further comprising an aircraft wherein the aircraft comprises the target.

14. The system according to claim 13 comprising a further aircraft wherein the further aircraft comprises the transmitter.

15. A system for determining a relative position between a target and a transmitter in an area, wherein relative position is defined by the parameters
relative angular direction $\theta 1$, $\theta 2$ and
distance,
the system comprising
a transmitter configured to generate light beams wherein the generation of the one or more light beams comprises diffracting broadband light in such a way that different optical frequency wavelengths are diffracted differently and a relative angular direction $\theta$ is detected by reading the optical frequency wavelength, the transmitter comprising
one or more broadband light sources,
one or more diffraction gratings, and
a target comprising
two or more receptors,
means in connection with the two or more receptors, said means configured to determine the two or more relative angular directions $\theta 1$, $\theta 2$ by reading two or more optical frequency wavelengths by a method comprising the steps of:
producing one or more light beams,
transmitting, by the transmitter, such one or more light beams, wherein a light beam indicates a relative angular direction from the transmitter,
receiving, by the target, one or more of the light beams, wherein the generation of the one or more light beams comprises diffracting broadband light in such a way that different optical frequency wavelengths are diffracted differently and a relative angular direction $\theta$ is detected by reading the optical frequency wavelength, and
means configured to determine the distance between the target and the transmitter by triangulation, given a predetermined distance between the two or more receptors and the two or more relative angular directions $\theta 1$, $\theta 2$.

16. A system according to claim 13 wherein
the broadband light source comprises:
a monomode light source, and
one or more optical frequency comb generators, configured to receive the light from the monomode light source, and
the optical frequency wavelength is related to an electronic frequency which is received by the receptor.

17. The system according to claim 16 wherein the monomode light source comprises a laser light source.

* * * * *